Aug. 19, 1941.  O. B. ARNOLD  2,252,798
DENTAL FORCEPS
Filed Aug. 19, 1940
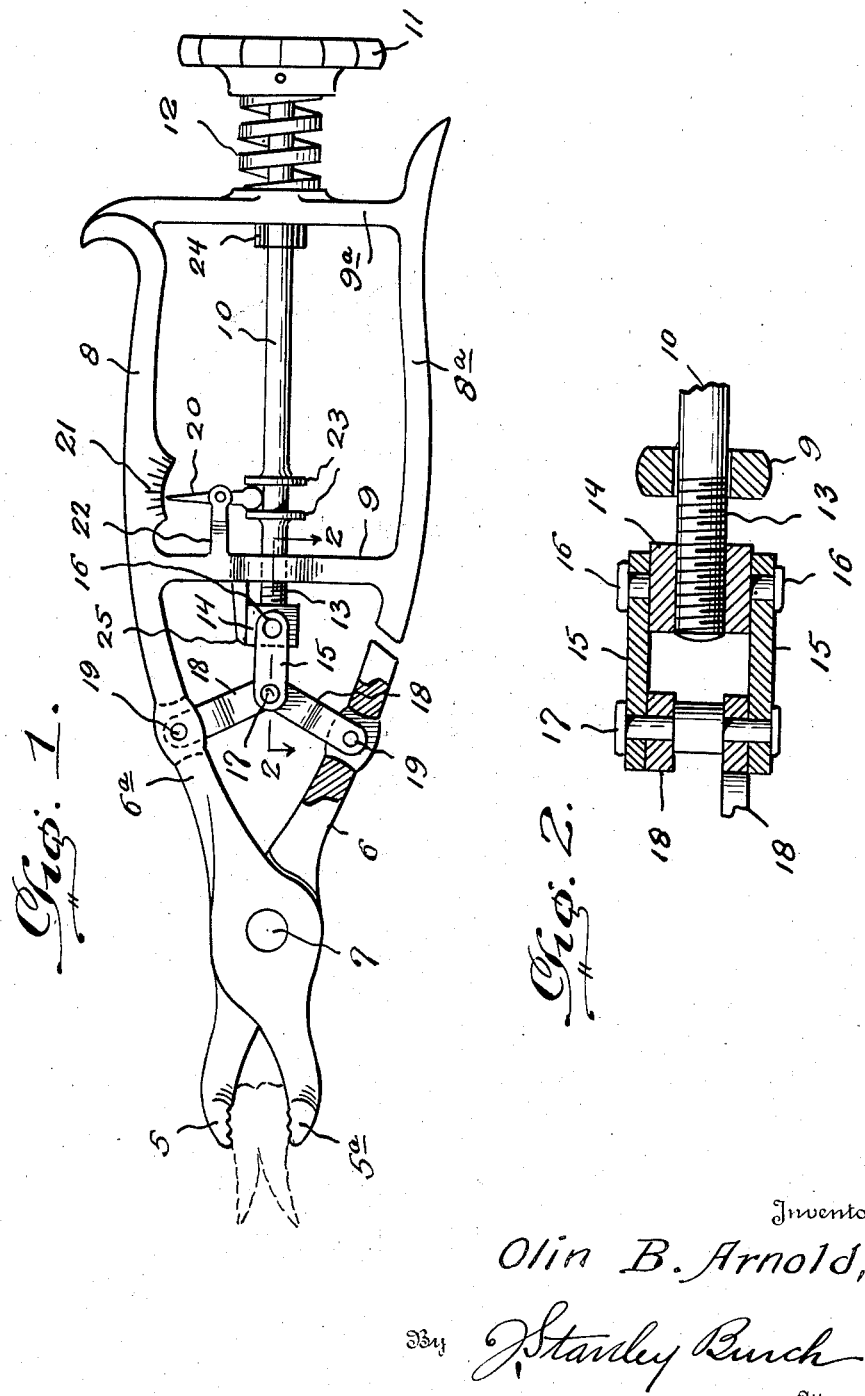
Inventor
Olin B. Arnold,
By Stanley Burch
Attorney Patented Aug. 19, 1941

2,252,798

UNITED STATES PATENT OFFICE 2,252,798

DENTAL FORCEPS

Olin B. Arnold, San Antonio, Tex.

Application August 19, 1940, Serial No. 353,311

5 Claims. (Cl. 32—62)

This invention relates to improvements in dental forceps, and the primary object of the present invention is to provide a device of this kind by means of which a tooth may be gripped with any desired predetermined power which shall be constant in its nature and sustained without any further exertion of the operator after once being fixed.

A further object of the present invention is to provide dental forceps in which the grip upon a tooth is not dependent upon the muscular power of the operator and the constant maintenance of such muscular power, and wherein means is provided for indicating the gripping or crushing pressure applied to the tooth when the jaws of the forceps are adjusted in engagement therewith.

A still further object is to provide dental forceps characterized as described above and embodying extreme simplicity and durability of construction, as well as efficiency in operation.

The present invention consists in the novel form, combination and arrangement of parts hereinafter more fully described, shown in the accompanying drawing and claimed.

In the drawing:

Figure 1 is an inverted plan view of a pair of forceps embodying my invention, parts being broken away and in section; and Figure 2 is an enlarged fragmentary longitudinal section on line 2—2 of Figure 1.

Referring in detail to the drawing, the present forceps include a pair of jaws 5 and 5a having handles 6 and 6a which are crossed and pivoted together at the point of crossing as at 7. The handle 6a has a rectangular frame at its inner end including a side grip bar 8 constituting a continuation of the handle 6a, a second side grip bar 8a arranged in substantial continuation of but entirely unconnected to the handle 6, and transverse frame members 9 and 9a. The transverse bars 9 and 9a are provided intermediate their ends with longitudinally alined openings through which a rod 10 freely slidably extends. This rod 10 projects rearwardly beyond the rear cross bar 9a and is provided upon its rear terminal end with a suitable handle or knob 11 to facilitate manual turning of the same. In addition, a helical compression spring 12 encircles the rear projecting end portion of rod 10 and is interposed between the rear transverse or cross bar 9a and the knob 11 so as to normally yieldingly maintain the rod 10 in a rearwardly displaced position. The forward end of rod 10 is threaded as at 13 and has threaded engagement in a nut 14 disposed between and pivoted to the rear or inner end of spaced links 15, as at 16. The forward ends of links 15 are pivotally connected as at 17 to the inner ends of inwardly and rearwardly converging links 18 whose outer ends are respectively pivoted as at 19 to the handles 6 and 6a of the jaws 5 and 5a. It will thus be seen that when the rod 10 is rotated it may be threaded into the nut 14, thereby causing rearward or inward movement of said nut and exerting a corresponding pull on the links 15 and 18. This pull on the links causes actuation of the handles 6 and 6a so as to swing them together and correspondingly swing the jaws 5 and 5a toward each other for obtaining the desired grip upon the tooth as indicated by dotted lines in Figure 1. Thus, the jaws 5 and 5a may be set to have the desired gripping power upon the tooth, and this power will remain constant and be sustained without any further exertion of the operator after once being fixed, as long as the grip is maintained upon the same part of the tooth. Should the jaws slip to a smaller portion of the tooth, the grip will be substantially maintained due to the tension of the spring 12 which has been placed under a certain amount of compression by the threading of rod 10 into the nut member 14.

The present forceps also provide means for indicating the gripping or crushing power exerted upon the tooth by the jaws 5 and 5a when they have been adjusted. For this purpose, a pivoted pointer 20 is associated with a scale 21 and operatively connected with the rod 10 so that longitudinal movement of said rod which occurs in adjusting the jaws in engagement with a tooth will cause shifting of the pointer across the scale 21. In the construction shown, an inwardly or rearwardly projecting arm 22 is provided on the forward cross bar 9, and the pointer 20 is pivoted intermediate its ends to the rear end of this arm 22, the inner end of pointer 20 being disposed between spaced flanges or collars 23 fixed upon the rod 10, and the scale 21 being provided on a portion of the frame member or grip bar 8 adjacent the outer end of the pointer 20.

A collar 24 is secured on rod 10 so as to engage cross bar 9a and properly limit the rearward movement of said rod under the action of spring 12. Also, a guide lug 25 rigid with cross bar 9 engages one side of nut 14 so as to prevent any tendency of said nut to turn. This relieves the links 15 and pivots 16 of performing this function.

From the foregoing description, the construction and operation, as well as the advantages of the present invention will be readily understood and appreciated by those skilled in the art. It will be seen that I have provided a very efficient device for the intended purpose which is simple and durable in construction, economical to manufacture, easy to use, and efficient in use. Minor changes in details of construction illustrated and described are contemplated within the spirit and scope of the invention as claimed.

What I claim as new is:

1. Dental forceps comprising a pair of jaws provided with handles, said handles being crossed and pivotally connected together at the point of crossing, a frame rigid with the inner end of the handle of one jaw and entirely unconnected with the handle of the other jaw, said frame including side grip bars and forward and rear transverse bars rigidly connecting said side grip bars, a rod slidable and rotatable through said transverse bars, links connecting the handles of the jaws, a nut connected to the links, said rod having threaded engagement in the nut whereby turning of the rod will cause actuation of the handles for adjusting the jaws toward each other, and a handle on the inner end of said rod for manually rotating the same.

2. Dental forceps comprising a pair of jaws provided with handles, said handles being crossed and pivotally connected together at the point of crossing, a frame rigid with the inner end of the handle of one jaw and entirely unconnected with the handle of the other jaw, said frame including side grip bars and forward and rear transverse bars rigidly connecting said side grip bars, a rod slidable and rotatable through said transverse bars, links connecting the handles of the jaws, a nut connected to the links, said rod having threaded engagement in the nut whereby turning of the rod will cause actuation of the handles for adjusting the jaws toward each other, a handle on the inner end of said rod for manually rotating the same, and a helical compression spring encircling the rod between its handle and the rear transverse bar of the frame.

3. Dental forceps comprising a pair of jaws provided with handles, said handles being crossed and pivotally connected together at the point of crossing, a frame rigid with the inner end of the handle of one jaw and entirely unconnected with the handle of the other jaw, said frame including side grip bars and forward and rear transverse bars rigidly connecting said side grip bars, a rod slidable and rotatable through said transverse bars, links connecting the handles of the jaws, a nut connected to the links, said rod having threaded engagement in the nut whereby turning of the rod will cause actuation of the handles for adjusting the jaws toward each other, a handle on the inner end of said rod for manually rotating the same, and means including a pointer operatively connected to said rod and a dial carried by the frame for indicating the gripping pressure of the jaws upon a tooth when the jaws are set through operation of said rod.

4. Dental forceps including jaws provided with handles crossed and pivotally connected together at their point of crossing, screw-operating means for actuating the handles so as to adjust the jaws into gripping engagement with a tooth and to maintain such gripping engagement, and means for indicating the adjustment of said jaws so that predetermined crushing power may be applied to a tooth by the adjustment of said jaws.

5. Dental forceps including jaws provided with handles crossed and pivotally connected together at their point of crossing, screw-operating means for actuating the handles so as to adjust the jaws into gripping engagement with a tooth and to maintain such gripping engagement, means for indicating the adjustment of said jaws so that predetermined crushing power may be applied to a tooth by the adjustment of said jaws, said screw-operating means including a frame rigid with one of the jaw handles and independent of the other jaw handle, and a threaded operating rod rotatable and slidable in the frame and operatively connected with the jaw handles, and a compression spring yieldingly urging the rod rearwardly.

OLIN B. ARNOLD.